United States Patent
Gaiot et al.

(10) Patent No.: US 8,004,530 B2
(45) Date of Patent: Aug. 23, 2011

(54) VIDEO CONTROLLER SWITCHING SYSTEM AND METHOD

(75) Inventors: Louis M. Gaiot, Severence, CO (US); Lance Celli, Severence, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1427 days.

(21) Appl. No.: 11/261,170

(22) Filed: Oct. 28, 2005

(65) Prior Publication Data

US 2007/0097105 A1    May 3, 2007

(51) Int. Cl.
*G06F 15/16* (2006.01)

(52) U.S. Cl. .................. 345/502; 709/203; 709/217

(58) Field of Classification Search .......... 345/520, 345/502; 709/203, 217
See application file for complete search history.

(56) References Cited

U.S. PATENT DOCUMENTS

| | | | |
|---|---|---|---|
| 5,193,174 A | 3/1993 | Bealkowski et al. | |
| 5,485,570 A * | 1/1996 | Busboom et al. | 715/751 |
| 5,799,204 A * | 8/1998 | Pesto, Jr. | 710/10 |
| 6,170,021 B1 | 1/2001 | Graf | |
| 6,304,244 B1 * | 10/2001 | Hawkins et al. | 345/502 |
| 6,317,798 B1 | 11/2001 | Graf | |
| 6,321,287 B1 | 11/2001 | Rao et al. | |
| 6,408,334 B1 | 6/2002 | Bassman et al. | |
| 6,487,464 B1 | 11/2002 | Martinez et al. | |
| 6,609,151 B1 | 8/2003 | Khanna et al. | |
| 6,721,868 B1 | 4/2004 | Natu et al. | |
| 6,763,456 B1 | 7/2004 | Agnihotri et al. | |
| 6,774,904 B2 | 8/2004 | Emerson et al. | |
| 6,819,322 B2 | 11/2004 | Emerson et al. | |

* cited by examiner

*Primary Examiner* — Xiao Wu
*Assistant Examiner* — Scott E Sonners

(57) ABSTRACT

A video controller switching system comprises a computing platform having a user video controller configured to control non-administrative video output of the computing platform, a management module video controller disposed on the computing platform configured to control administrative video output for the computing platform and a switching module configured to selectively enable/disable the user video controller and the management module video controller based on a predetermined video controller setting.

32 Claims, 2 Drawing Sheets

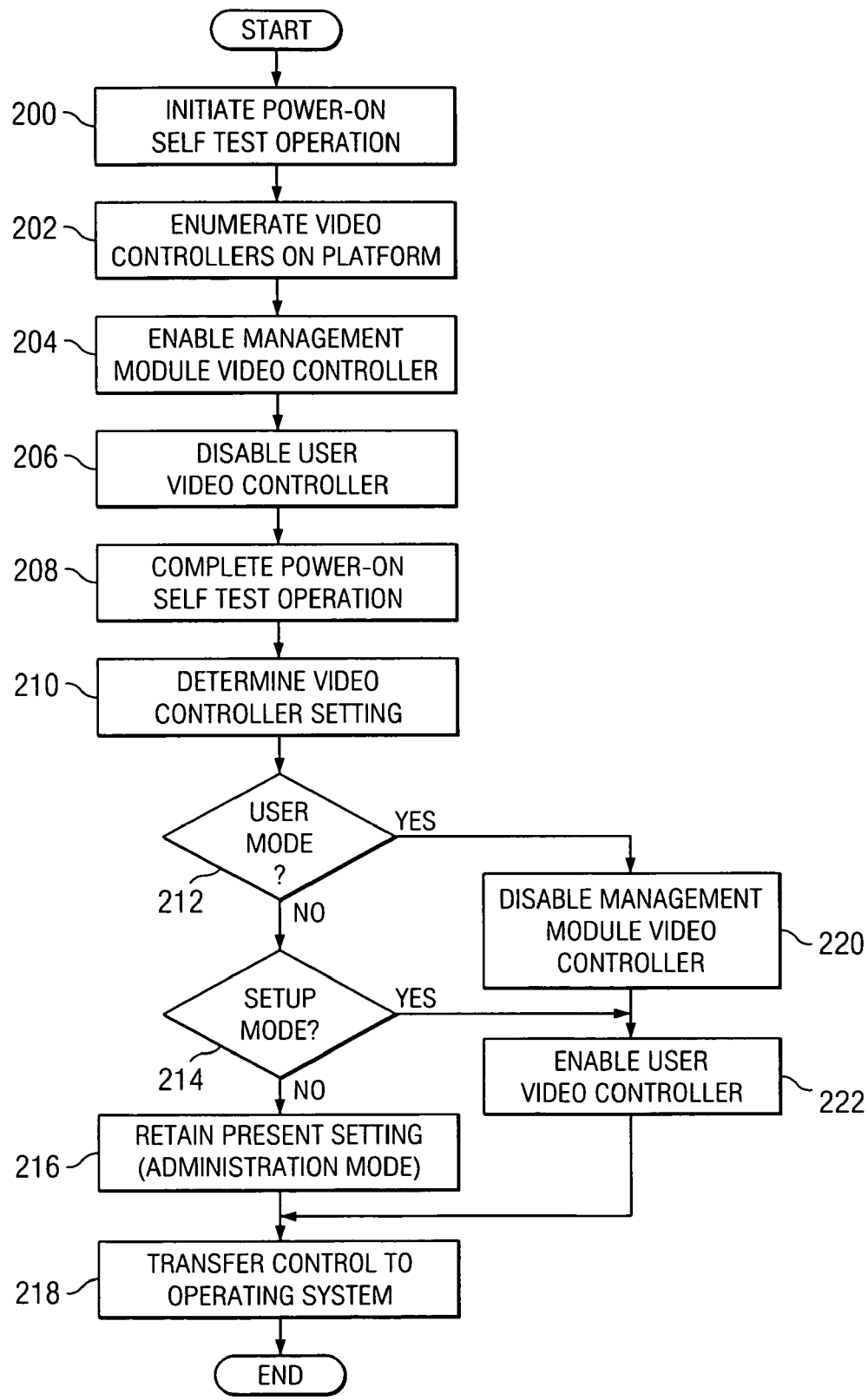

VIDEO CONTROLLER SWITCHING SYSTEM AND METHOD

BACKGROUND OF THE INVENTION

In a remote computing platform architecture, the remote computing platform generally includes a management or administration application for enabling an administrator to perform configuration changes, health monitoring, etc. Such administration applications generally include a video controller for controlling and/or providing video or graphic output to the administrator (e.g., output to a remote console or client). For example, the administration application video controller is generally a low-performance controller with limited functionality associated with administrative-related tasks. However, an operating system of the computing platform having both an administrative-related video controller and a separate, relatively high performance video controller will detect both video controllers on the platform and configure the platform as a multi-controller platform, thereby adversely affecting a non-administrative user's viewable desktop environment.

BRIEF DESCRIPTION OF THE DRAWINGS

For a more complete understanding of the present invention and the advantages thereof, reference is now made to the following descriptions taken in connection with the accompanying drawings in which:

FIG. 2 is a flow diagram illustrating an embodiment of a video switching method in accordance with the present invention.

DETAILED DESCRIPTION OF THE DRAWINGS

Figure 1:
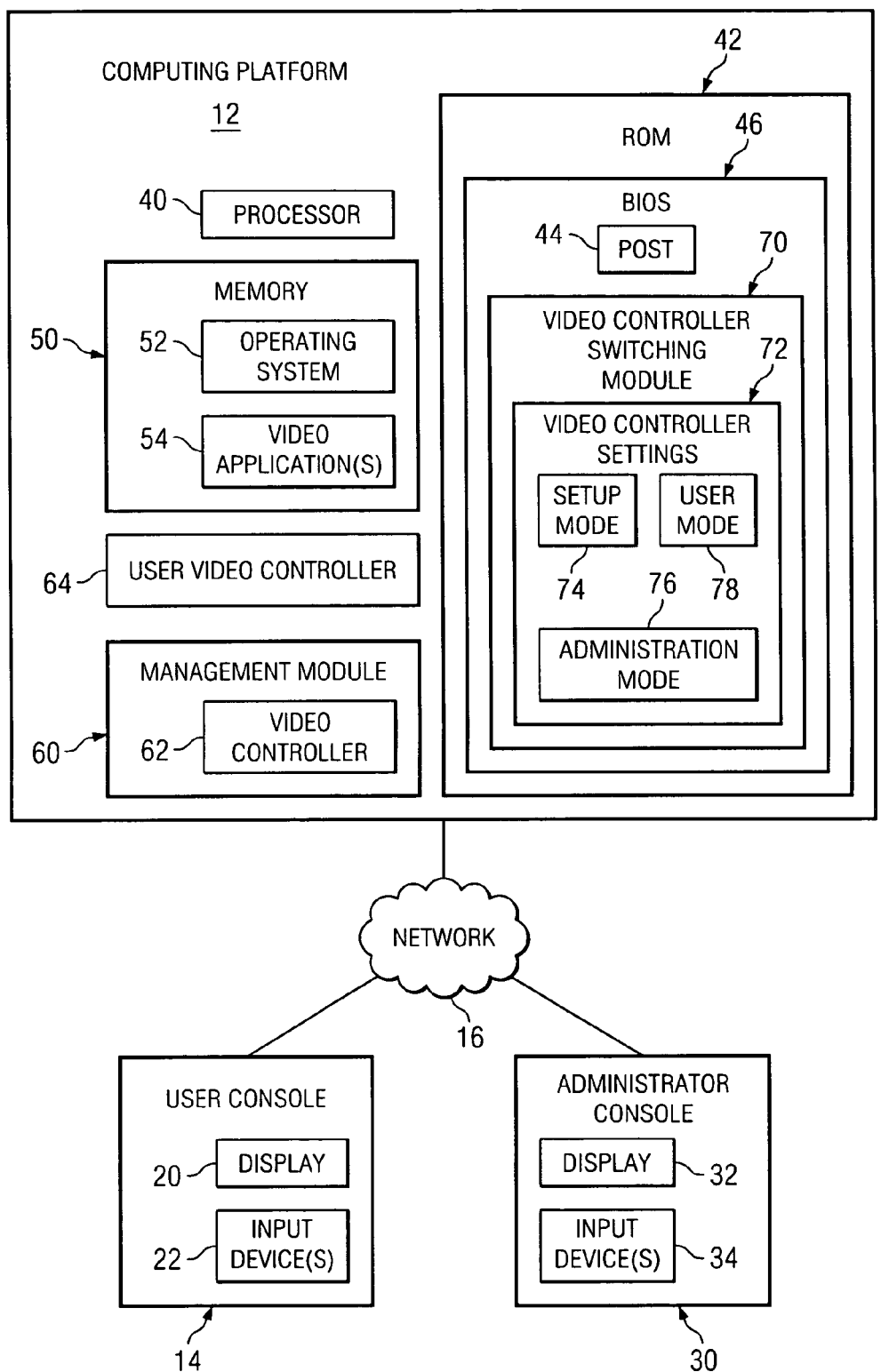
FIG. 1 is a diagram illustrating an embodiment of a video switching system in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of a video controller switching system 10 in accordance with the present invention. In the embodiment illustrated in FIG. 1, system 10 comprises a distributed computing environment having a computing platform 12 communicatively coupled to a remote user console 14 by a communication network 16. User console 14 is preferably a slim console having a display device 20 and one or more input devices 22 such as, but not limited to, a keyboard or mouse. In the embodiment illustrated in FIG. 1, system 10 also comprises an administrator console 30 having a display device 32 and one or more input devices 34. It should be understood that administrator console 30 may be configured similar to or different from user console 14. In operation, administrator console 30 enables an administrator to remotely access computing platform 12 via communication network 16 to perform various administrative and/or management operations associated with computing platform 12. It should also be understood that in some embodiments of the present invention, an administrator may also perform such administrative and/or management operations from user console 14. Preferably, computing platform 12 is a dedicated platform for providing various processing capabilities and/or functions to a particular user via user console 14. However, it should be understood that system 10 may be otherwise configured.

In the embodiment illustrated in FIG. 1, computing platform 12 comprises a processor 40 and a read-only memory (ROM) 42 having a basic input/output system (BIOS) 46 with a power-on self test (POST) system 44. In the embodiment illustrated in FIG. 1, computing platform 12 also comprises a memory 50 having an instance of an operating system 52 and one or more video applications 54. Video applications 54 may comprise any type of application or element configured and/or otherwise capable of outputting video content to a video controller. As used herein, "video" shall mean any type of graphic or visual content, whether or not an audio component is present. For example, video application(s) 54 may comprise a three-dimensional modeling application, media player application, video conferencing application, or other type of application or element having at least a graphical component output.

In the embodiment illustrated in FIG. 1, computing platform 12 also comprises a management module 60 for enabling an administrator to perform various types of administrative and/or management operations associated with computing platform 12 such as, but not limited to, configuration setting changes, health monitoring, system diagnostics or otherwise. In the embodiment illustrated in FIG. 1, management module 60 comprises a video controller 62 for controlling and/or otherwise providing video output associated with use of management module 60. In FIG. 1, computing platform 12 also comprises a user video controller 64 used for controlling and/or otherwise providing video output for non-administrative users of computing platform 12 (e.g., video output to user console 14). Generally, user video controller 64 comprises a relatively high performance video controller to facilitate graphic-intensive processing associated with various types of video applications 54 by a user via user console 14 (e.g., three-dimensional graphic-intensive applications). Because of a lack of graphic-intensive processing requirements associated with management module 60 (e.g., two-dimensional and/or textual data processing), video controller 62 generally comprises a relatively lower performance video controller as compared to user video controller 64, thereby reducing costs associated with computing platform 12. However, it should be understood that video controllers 62 and 64 may be otherwise configured.

In the embodiment illustrated in FIG. 1, BIOS 46 comprises a video controller switching module 70 for controlling an enabled or disabled state of video controllers 62 and 64, thereby controlling which video controller 62 and/or 64 provides video service for computing platform 12. For example, in the embodiment illustrated in FIG. 1, video controller switching module 70 comprises video controller settings 72 defining various controller settings associated with video controllers 62 and 64. For example, in the embodiment illustrated in FIG. 1, video controller settings 72 comprise a setup mode 74, an administration mode 76 and a user mode 78. However, it should be understood that a variety of types of video controller settings 72 may be provided. Preferably, such modes 74, 76 and 78 are configured and/or otherwise selected by an administrator for computing platform 12 (e.g., during POST 44 operations or after control of computing platform 12 has been transferred to operating system 52 (e.g., by accessing management module 60)).

Preferably, setup mode 74 is configured to have both video controller 62 and video controller 64 in an enabled state to facilitate detection of video controllers 62 and 64 by operating system 52 and enable an administrator to load drivers and/or perform other functions or services associated with video controllers 62 and 64. Preferably, administration mode 76 is configured having video controller 62 enabled and user video controller 64 disabled, thereby limiting video output for administrative and/or management services. Preferably, user mode 78 is configured having user video controller 64 enabled and video controller 62 disabled, thereby providing increased video processing capabilities to a non-administrative user of computing platform 12 via user console 14.

In operation, in response to a power on condition of computing platform 12, BIOS 46 initiates POST 44 operations to enumerate the various components of computing platform 12, such as user video controller 64 and management module video controller 62. During POST 44 operations, video controller switching module 70 automatically enables video controller 62 and disables user video controller 64, thereby enabling an administrator to perform various administrative and/or management functions relating to computing platform 12 using management module 60 during POST 44 operations.

After completion of POST 44 operations, video controller switching module 70 automatically applies one of the predetermined video controller settings 72 to selectively enable/disable video controllers 62 and 64. For example, for setup mode 74, video controller switching module 70 automatically enables user video controller 64 such that both video controller 62 and user video controller 64 are enabled. Accordingly, after transfer of control of computing platform 12 from BIOS 46 to operating system 52, video controller 62 and 64 are both enabled to facilitate installation of drivers and/or other setup or configuration management operations corresponding to video controller 62 and 64.

In administration mode 76, video controller switching module 70 retains the current video controller setting (e.g., video controller 62 enabled and user video controller 64 disabled) or otherwise causes video controller 62 to be enabled and user video controller 64 to be disabled such that upon transfer of control of computing platform 12 to operating system 52, video output is provided only by management module video controller 62, thereby limiting video output to administrative and/or management operations by management module 60. In user mode 78, video controller switching module 70 automatically disables video controller 62 and enables user video controller 64 such that upon transfer of control of computing platform 12 to operating system 52, video output is provided by user video controller 64, thereby providing high performance graphics processing to a user of computing platform 12 by user console 14.

In operation, an administrator may change the predetermined video controller setting 72 for computing platform 12 during POST 44 operations or after control of computing platform 12 has been transferred to operating system 52. For example, an administrator may access management module 60 (e.g., via administrator console 30 or otherwise), change the video controller setting 72, and reboot the computing platform 12. Thus, embodiments of the present invention enable preservation of functionality associated with both management module video controller 62 and user video controller 64, thereby enabling high performance and a rich desktop experience for user console 14 in a user mode 78 setting and functionality associated with video controller 62 in an administration mode 76 setting.

FIG. 2 is a flow diagram illustrating an embodiment of a video controller switching method in accordance with the present invention. The method begins at block 200, where BIOS 46 initiates POST 44 operations. At block 202, BIOS 46 enumerates the various components available on computing platform 12 such as, but not limited to, management module video controller 62 and user video controller 64. At block 204, video controller switching module 70 automatically enables management module video controller 62. At block 206, video controller switching module 70 automatically disables user video controller 64. At block 208, BIOS 46 continues and/or otherwise completes POST 44 operations.

At block 210, video controller switching module 70 accesses video controller settings 72 to selectively enable/disable video controller 62 and 64 based on a selected and/or designated one of settings 72. At decisional block 212, a determination is made whether the user mode 78 is designated. If user mode 78 is not designated, the method proceeds to decisional step 214, where a determination is made whether setup mode 74 is designated. If setup mode 74 is not designated, the method proceeds to block 216, where video controller switching module 70 retains a present setting for video controllers 62 and 64 (e.g., management module video controller 62 enabled and user video controller 64 disabled). At block 218, BIOS 46 transfers control of computing platform 12 to operating system 52. The method then ends.

At decisional step 212, if a determination is made that the video controller setting 72 for user mode 78 is designated, the method proceeds to block 220, where video controller switching module 70 disables management module video controller 62. At block 222, video controller switching module 70 enables user video controller 64. The method proceeds to block 218, where BIOS 46 transfers control of computing platform 12 to operating system 52. At decisional block 214, if a determination is made that the video controller setting 72 for setup mode 74 is designated, the method proceeds to block 222, where video controller switching module 70 enables user video controller 64, thereby resulting in both management module video controller 62 and user video controller 64 in an enabled state. The method then proceeds to block 218, where BIOS 46 transfers control of computing platform 12 to operating system 52.

It should be understood that in the described method, certain functionality may be omitted, accomplished in a sequence different from that depicted in FIG. 2, or performed simultaneously or in combination. Also, it should be understood that the method depicted in FIG. 2 may be altered to encompass any of the other features or aspects of the invention as described elsewhere in the specification. Further, embodiments of the present invention may be implemented in software and can be adapted to run on different platforms and operating systems. In particular, functions implemented by video controller switching module 70, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

What is claimed is:

1. A video controller switching system, comprising:
a computing platform having a user video controller configured to control only non- administrative video output of the computing platform;
a management module video controller disposed on the computing platform configured to control only administrative video output for the computing platform, wherein the administrative video output comprises output related to configuration setting changes, health monitoring, or system diagnostics of the computing platform, wherein the management module video controller is configured to transmit the administrative video output across a network to a console remotely connected to the computing platform via the network; and a switching module configured to selectively enable the user video controller or the management module video controller based on a predetermined video controller setting.

2. The system of claim 1, wherein the switching module is configured to enable the management module video controller and disable the user video controller in an administration mode setting.

3. The system of claim 1, wherein the switching module is configured to enable the user video controller and disable the management module video controller in a user mode setting.

4. The system of claim 1, wherein the switching module is configured to concurrently enable the management module video controller and the user video controller in a setup mode setting.

5. The system of claim 1, wherein the switching module is disposed on a basic input/output system (BIOS).

6. The system of claim 1, wherein the switching module is configured to apply the video controller setting after a power-on self test (POST) operation.

7. The system of claim 1, wherein the switching module is configured to apply the video controller setting before transferring control of the computing platform to an operating system.

8. The system of claim 1, wherein the switching module is configured to enable a change to the predetermined video controller setting during a POST operation.

9. The system of claim 1, wherein the switching module is configured to enable a change to the predetermined video controller setting using a management module disposed on the computing platform.

10. A video controller switching method, comprising:
providing a computing platform having a user video controller configured to control only non-administrative video output for the computing platform;
providing a management module video controller on the computing platform configured to provide only administrative video output for the computing platform, wherein the administrative video output comprises output related to configuration setting changes, health monitoring, or system diagnostics of the computing platform, wherein the management module video controller is configured to transmit the administrative video output across a network to a console remotely connected to the computing platform via the network; and
selectively enabling the user video controller, the management module video controller, or both the user video controller and the management video controller concurrently based on a predetermined video controller setting.

11. The method of claim 10, wherein selectively enabling comprises enabling the management module video controller and disabling the user video controller in an administration mode setting.

12. The method of claim 10, wherein selectively enabling comprises enabling the user video controller and disabling the management module video controller in a user mode setting.

13. The method of claim 10, wherein selectively enabling comprises enabling the management module video controller and the user video controller in a setup mode setting.

14. The method of claim 10, further comprising applying the video controller setting after a power-on self test (POST) operation.

15. The method of claim 10, further comprising applying the video controller setting before transferring control of the computing platform to an operating system.

16. The method of claim 10, further comprising enabling a change to the predetermined video controller setting during a POST operation.

17. The method of claim 10, further comprising enabling a change to the predetermined video controller setting using the management module.

18. A video controller switching system, comprising:
means, disposed on a computing platform, for controlling only non-administrative video output of the computing platform;
means, disposed on the computing platform, for controlling only administrative video output of the computing platform, wherein the administrative video output comprises output related to configuration setting changes, health monitoring, or system diagnostics of the computing platform, wherein the means for controlling only administrative video output of the computing platform is configured to transmit the administrative video output across a network to a console remotely connected to the computing platform via the network; and
means for selectively enabling the non-administrative video controlling means, the administrative video controlling means, or both the non-administrative video controlling means and the administrative video controlling means concurrently based on a predetermined video controller setting.

19. The method of claim 18, wherein the means for selectively enabling is configured to apply the predetermined video controller setting after a power-on self test (POST) operation.

20. The method of claim 18, wherein the means for selectively enabling is configured to enable the administrative video controlling means and disable the non-administrative video controlling means in an administration mode setting.

21. The method of claim 18, wherein the means for selectively enabling is configured to enable the non-administrative video controlling means and disable the administrative video controlling means in a user mode setting.

22. The method of claim 18, wherein the means for selectively enabling is configured to enable the administrative video controlling means and the non-administrative video controlling means in a setup mode setting.

23. A video controller switching system, comprising:
a computing platform having a plurality of video controllers disposed thereon, whereby a first video controller of the plurality of video controllers is configured to control only output associated with administration services for the computing platform, wherein the administrative services relate to configuration setting changes, health monitoring, or system diagnostics of the computing platform, wherein the first video controller is configured to transmit the output associated with administrative services across a network to a console remotely connected to the computing platform; and
a switching module disposed on the computer platform and configured to selectively enable each of the plurality of video controllers after a power-on self test (POST) operation of the computing platform via the network.

24. The system of claim 23, wherein the switching module is configured to selectively enable each of the plurality of video controllers concurrently based on a predetermined video controller setting.

25. The system of claim 23, wherein the switching module is configured to enable the first video controller for the computing platform and disable a remainder of the plurality of video controllers.

26. The system of claim 23, wherein the switching module is disposed on a basic input/output system (BIOS) of the computing platform.

27. The system of claim 23, wherein the computing platform comprises a dedicated computing platform configured to provide video output to a client console.

28. A non-transitory computer-readable medium having stored thereon an instruction set to be executed, the instruction set, when executed by a processor, causes the processor to:

selectively enable each of a plurality of video controllers disposed on a computing platform after a power-on self test (POST) operation of the computing platform, whereby a first video controller of the plurality of video controllers is configured to control only output associated with administration services for the computing platform, wherein the administrative services relate to configuration setting changes, health monitoring, or system diagnostics of the computing platform, wherein the first video controller is configured to transmit the output associated with administrative services across a network to a console remotely connected to the computing platform via the network.

29. The non-transitory computer-readable medium of claim 28, wherein the instruction set, when executed by the processor, causes the processor to access a predetermined video controller setting to determine an enable or disable setting for each of the plurality of video controllers.

30. The non-transitory computer-readable medium of claim 28, wherein the instruction set, when executed by the processor, causes the processor to enable the first video controller for the computing platform and disable a remainder of the plurality of video controllers.

31. The non-transitory computer-readable medium of claim 28, wherein the instruction set, when executed by the processor, causes the processor to enable a user video controller associated with non-administrative use of the computing platform and disable a remainder of the plurality of video controllers.

32. The non-transitory computer-readable medium of claim 28, wherein the instruction set, when executed by the processor, causes the processor to enable the first video controller for the computing platform and enable a user video controller associated with non-administrative use of the computing platform concurrently.

* * * * *